(12) United States Patent
Brablec

(10) Patent No.: US 6,208,714 B1
(45) Date of Patent: Mar. 27, 2001

(54) TELEPHONE ANSWERING APPARATUS FOR INDICATING THE PRESENCE OF A POWER CYCLE

(75) Inventor: Milos Brablec, Skokie, IL (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/088,580

(22) Filed: Jun. 2, 1998

(51) Int. Cl.[7] ............................. H04M 1/64; H04M 11/00
(52) U.S. Cl. ..................... 379/67.1; 379/13; 379/88.09; 379/88.22; 379/102.04; 379/186
(58) Field of Search ..................... 379/67.1, 68, 1, 379/13, 15, 88.09, 88.08, 88.22, 88.28, 93.05, 93.29, 93.36, 102.04, 106.04, 307, 318, 322, 323, 350, 351, 401, 413, 124–131, 186–190; 358/434–468; 368/46, 59

(56) References Cited

U.S. PATENT DOCUMENTS

| | | | |
|---|---|---|---|
| 4,490,050 | * 12/1984 | Singhi | 368/46 |
| 4,853,952 | 8/1989 | Jachmann et al. | 379/88.11 |
| 4,907,249 | 3/1990 | Nebel | 375/351 |
| 4,924,496 | * 5/1990 | Figa et al. | 379/142 |
| 5,280,369 | 1/1994 | Minamizawa | 358/479 |
| 5,394,445 | * 2/1995 | Ball et al. | 379/88.21 |
| 5,483,577 | * 1/1996 | Gulick | 379/88.07 |
| 5,631,745 | * 5/1997 | Wong et al. | 358/434 |
| 5,687,222 | 11/1997 | Mc Laughlin et al. | 379/93.29 |
| 5,727,047 | 3/1998 | Bentley et al. | 379/93.05 |

* cited by examiner

*Primary Examiner*—Fan Tsang
*Assistant Examiner*—Allan Hoosain
(74) *Attorney, Agent, or Firm*—Baniak Pine & Gannon

(57) ABSTRACT

A telephone answering apparatus for indicating the presence of a power-cycle includes a memory device which stores a retrieved message and a value from a clock, and a controller operatively connected to the memory device and to the clock. The controller initializes the value of the clock to a power-up value upon receiving power from a source and the power-up value is stored along with the retrieved message in the memory device. A user may retrieve the stored power-up value along with the message into an application that is running on a host computer which will indicate that no time was recorded for the retrieved message.

20 Claims, 9 Drawing Sheets

TELEPHONE ANSWERING APPARATUS FOR INDICATING THE PRESENCE OF A POWER CYCLE

FIELD OF THE INVENTION

This invention relates generally to the field of automatic telephone answering systems and, in particular, to apparatus for indicating an incorrect time stamp on messages recorded after a power cycle.

BACKGROUND OF THE INVENTION

There are various types of systems which automatically answer an incoming call and maintain a telephone line connection which are broadly defined as automatic telephone answering systems. These systems include, for example, automatic telephone message recording equipment, message recording systems having remote access message playback, automatic telephone call forwarding equipment, automatic dial-up alarm receiving equipment, automatic answering data entry systems, and other telephone devices used in association with modern equipment. Many of these systems typically have a method of recording and time stamping messages which are received. In general, it is cost prohibitive for these systems to include battery backup to allow continuation of clock function during periods without power, or power-cycles. Accordingly, these existing methods, typically have no means to account for power cycles or the length of time power is off to the system. When power is shut off to the system and then returned, these devices continue to time stamp recorded messages with an incorrect time. When the user plays back the message, there is no indication that a power cycle has been experienced and the time stamps are inaccurate.

Accordingly, it would be desirable to have a simple and cost effective apparatus for indicating the presence of a power cycle that overcomes the disadvantages described above.

SUMMARY OF THE INVENTION

One aspect of the invention provides a telephone answering apparatus for indicating the presence of a power-cycle comprising a memory device which stores a received message in a value from a clock, and a controller operatively connected to the memory device and to the clock, wherein the controller initializes the value of the clock to a power-up value upon receiving power from a source and stores the power-up value along with a stored message in the memory device. The apparatus preferably includes a timer operatively connected to the clock. The apparatus may also comprise a user interface operatively connected to the controller to allow a user to reset the clock to a start-time value. The apparatus may further include an audio receiver operatively connected to the controller. The audio receiver may be operatively connected to a 2-wire to 4-wire network circuit. The 2-wire to 4-wire network circuit may be operatively connected to a switch. The audio receiver, timer, clock and controller may be preferably operably connected to a processor which is connected to a power supply. Preferably, the memory device is flash memory.

A further aspect of the invention provides a method of operating a telephone answering apparatus for indicating the presence of a power-cycle. A processor operably connected to a controller, audio receiver, timer and clock are provided. The controller is operably connected to a memory device and an application interface. Power is supplied to the processor. The clock is initialized to a power-up value. A message is received on an audio receiver while the clock is set to a power-up value and is then stored along with the power-up value in the memory device. The power-up value may then be retrieved into an application running on a host computer. An application input may be sent through the application interface to the controller to reset the clock to a start-time value. A message then received over the GSTN line is received on the audio receiver after the clock is set to the start-time value. A timer sends ticks to the clock and the clock start-time value is incremented to a clock value. The message received after the clock is set to the start-time value and the incremented clock value are stored to a memory device.

A further aspect of the invention provides a method of indicating the presence of a power-cycle on a time-stamped recorded message. The processor is powered-up. A clock is initialized to a power-up value. The message is received. The received message and the power-up value are stored to a memory device. The clock may be set to a start-time value and the clock may be incremented to provide a clock value. A second message may be received after the clock is set to a start-up value. The received second message and the clock value may be stored to a memory device. The message and power-up value may be retrieved into an application running on a host computer, and a display indicating that no time was recorded for the message may be displayed on the host computer.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
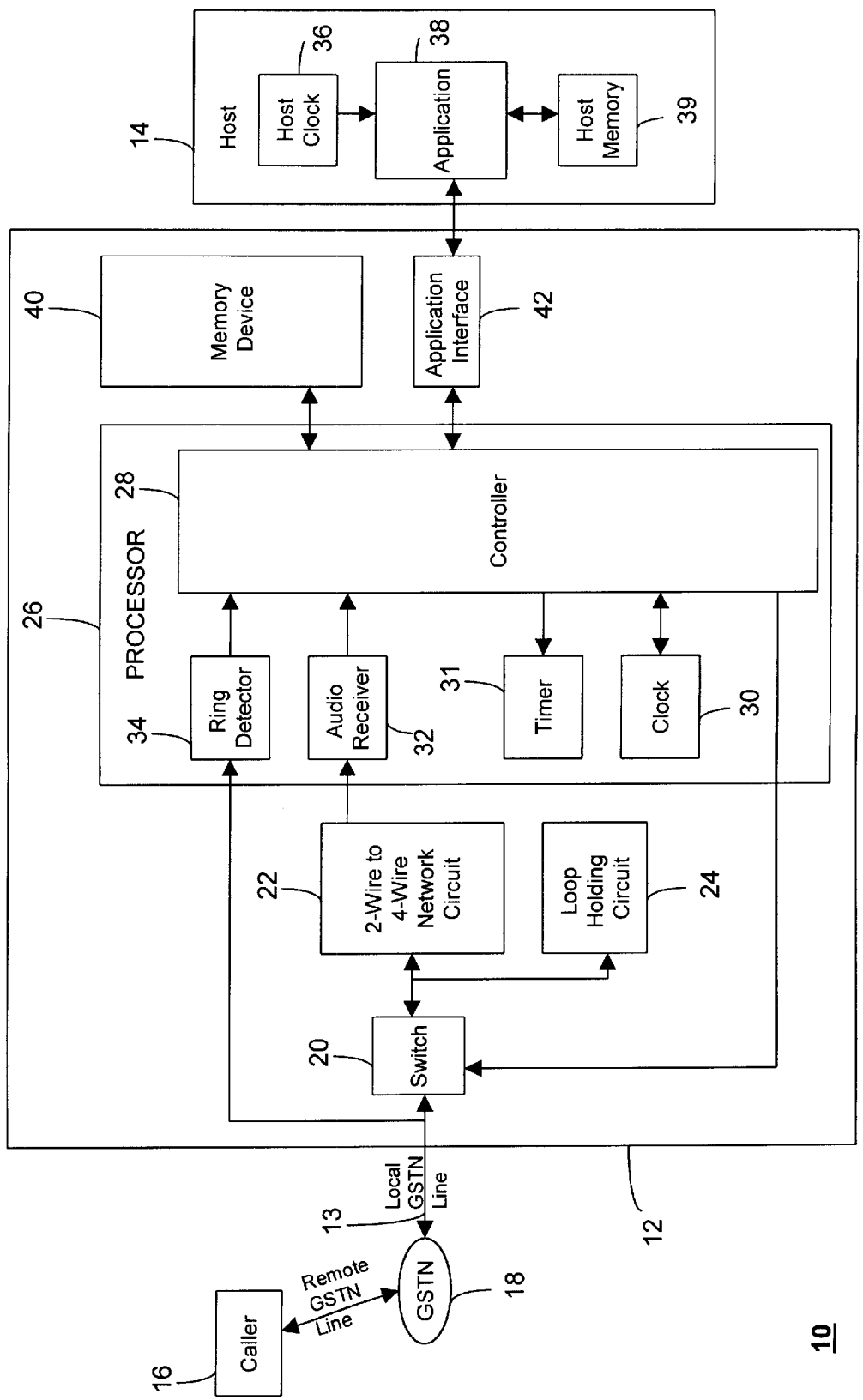
FIG. 1 is a block diagram of a preferred embodiment of a telephone answering apparatus in accordance with the invention.

As shown in FIG. 1, a telephone answering apparatus 10 for detecting the time of message reception includes a telephone answering device (TAD) 12 and a host computer 14. A caller 16 may establish a telephone connection to the telephone answering device 12 through a General Switched Telephone Network (GSTN) 18.

The telephone answering device 12 includes a switch 20, a 2-wire to 4-wire network circuit 22, a loop holding circuit 24, and a processor 26. The processor 26 may be any of the commercially available processors. The processor 26 may preferably be a digital signal processor such as, for example, a TMS 320C52 manufactured by Texas Instruments Inc. In the embodiment shown, the processor 26 may preferably execute software or firmware which functionally provides a controller 28, a timer 31, a device clock 30, an audio receiver 32, and a ring detector 34. One embodiment of the telephone answering device 12 may preferably be the Sportster Message Plus supplied by 3Com Corporation. Alternatively, the controller 28, timer 31, device clock 30, audio receiver 32, and ring detector 34 may be comprised of discrete circuits which may be operatively connected to the processor 26. The audio receiver 32 receives messages in the form of an audio signal from the caller 16 and converts the audio signal into audio data. The timer 31 provides a tick signal to the device clock 30. The ticks are used by the device clock 30 to measure time. The ring detector 34 detects incoming GSTN ring signals from the GSTN 18. The controller 28 controls the various functions carried out by the telephone answering device 12.

The switch 20 may be any of the commercially available switches including, for example, a relay switch or an electronic switch. As shown in FIG. 1, the switch 20 is operatively connected to the 2-wire to 4-wire network circuit 20 and the loop holding circuit 24. Upon activation of the switch 20 by the controller 28, the loop holding circuit 24 drains current from the GSTN 18. Upon detection of the current drain by the GSTN 18, the GSTN 18 establishes a telephone connection to the telephone answering device 12. A telephone connection between the caller 16 and telephone answering device 12 may be established if the caller 16 initiates transmission of a ring signal from the GSTN 18 to the telephone answering device 12.

The 2-wire to 4-wire network circuit 22 functions to combine signals which are both transmitted and received by the processor 26 along telephone line 13. In the embodiment shown in FIG. 1, the 2-wire to 4-wire network circuit 22 routs telephone signals from the telephone line 13 to the audio receiver 32.

The host computer 14 may preferably be, for example, any one of the commercially available computers. The host computer 14 has its own host clock 36 which is capable of providing a host time to an application 38 which may be run on the host computer 14. The application 38 may preferably be, for example, any program or software that is executed by the host computer 14 which has the capability to interact with the telephone answering device 12 and perform various functions. These functions may include, for example, receiving incoming messages from the caller 16 through the telephone answering device 12, and retrieving messages from the telephone answering device 12. One embodiment of the application 38 may be supplied by the French company BVRP Software and may be included with purchase of the Sportster Message Plus.

As shown in FIG. 1, the telephone answering device 12 further includes a memory device 40 which may be any of the commercially available memory devices such as, for example, an EEPROM (Electrically Erasable Programmable Read Only Memory), a SRAM (Static Random Access Memory) or Flash Memory suitable for storing messages received by the telephone answering device 12. An application interface 42 is operatively connected to the controller 28 and the application 38. The application interface 42 may be any of the commercially available devices (such as, for example, a serial port) suitable for providing an interface between the application 38 of the host computer 14 and the controller 28 of the telephone answering device 12.

In operation, when the telephone answering device 12 is powered on or turned on, the controller 28 initializes the device clock 30 to a power-up value, which is a specific value different from any other clock value that the device clock 30 may contain in all of its operating modes. For example, for the Sportster Message Plus, the device clock 30 is set to a power-up value which includes 255 days, 255 hours, 255 minutes, and 255 seconds. This value may never be reached in any of the device clock's operating modes because the device clock 30 saturates at 254 days, 24 hours, 0 minutes, and 0 seconds. When the telephone answering device 12 is powered on or turned on, the controller 28 also starts the timer 31 which provides regular ticks to the device clock 30. For the Sportster Message Plus, for example, each tick increments the device clock 30 two seconds. In order for the device clock 30 to be incremented, the device clock 30 must be initialized or reset to a start-time clock value such as, for example, a zero clock value. This is accomplished by a command sent by the application 38 through the application interface 42 (i.e., serial port) and executed by the controller 28 of the telephone answering device 12. This initialization is automatically executed immediately after termination of the application 38 is requested by a user of the host computer 14.

If termination of the application 38 is requested by a user of the host computer 14, the application 38 requests that the device clock 30 be reset to a start-time clock value or zero clock value. The request is received by the controller 28 via the application interface 42. Upon receipt of the request, the controller 28 resets the device clock 30 and sends a response back to the application 38 via the application interface 42 to acknowledge that the device clock 30 is reset. When the application 38 receives this acknowledgment, the application 38 stores the host time, which is the real time contained in the host clock, as a reference host clock value. The application 38 also enables the telephone answering device 12 to receive and store incoming messages from the caller 16 prior to the closing of the application 38. The application 38 subsequently closes or terminates.

When the application 38 is closed, the ring detector 34 detects incoming calls from the GSTN by detecting an incoming GSTN ring signal. The ring detector 34 reports the detection of a ring signal to the controller 28. The controller 28 establishes a telephone connection between the caller 16 and the telephone answering device 12 via the GSTN 18 by setting switch 20. The controller 28 then receives the caller's 16 message via the audio receiver 32 and stores it into the memory device 40. The controller 28 also stores an incremented device clock value which corresponds to the time in which the caller's message is received in the memory 40.

When a user of the host computer 14 desires to retrieve messages stored in the telephone answering device 12, the user opens the application 38 of the host computer 14. The application 38 disables the message storage function of the telephone answering device 12, and the audio data generated by the audio receiver 32 is routed directly through the application interface 42 and is stored in the host memory 39. In a preferred embodiment, the application 38 disables the message storage function of the telephone answering device 12 upon start-up of the application 38. The application 38 transmits a request via the application interface 42 to the telephone answering device 12 to retrieve the stored messages. The telephone answering device 12 then detects the application's 38 request to retrieve new messages which are stored in the memory device 40. If the application's 38 request for message retrieval is detected by the controller 28, the controller 28 determines if there are any new messages in the memory device 40 to be retrieved. If there are new messages in the memory device 40, the controller 28 sends them together with their respective incremented device clock values one by one from the memory device 40 through the application interface 42 until there are no more new messages in the memory device 40 to be sent. The application 38 retrieves the messages and their associated incremented device clock values through the application interface 42. The application 38 determines the actual time of reception for each of the retrieved messages by adding the incremented device clock value to the stored reference host clock value. The retrieved messages are then marked as old in the memory device 40 so that the telephone answering device 12 can distinguish messages which have been retrieved from messages that have not yet been retrieved.

FIGS. 2A–2H illustrates one example of the operation of the telephone answering apparatus 10 in accordance with the invention. Reference is made to both FIGS. 1 and 2A–2H in the following discussion. Blocks 50–57 represent an example of a set of initial operating conditions of the telephone answering apparatus 10. The host computer 14 is turned on (Block 50), and the host clock 36 is running in real time (Block 51). The host clock 36 maintains real time even when turned off because it is connected to a battery back-up. The telephone answering device 12 is also turned on (Block 52), and is in the on hook state or condition (Block 54), which means that there is no telephone connection between the GSTN 18 and the telephone answering device 12. The device clock 30 is initialized by the controller 28 to a power-up value (Block 53) which is different than any other clock value that the device clock 30 may contain during its operation. The telephone answering device 12 is enabled by the controller 28 (Block 55) to receive and store messages. No new messages are stored in the memory 40 at this time (Block 56). The application 38 on the host computer 14 is closed (Block 57).

Figure 2A:
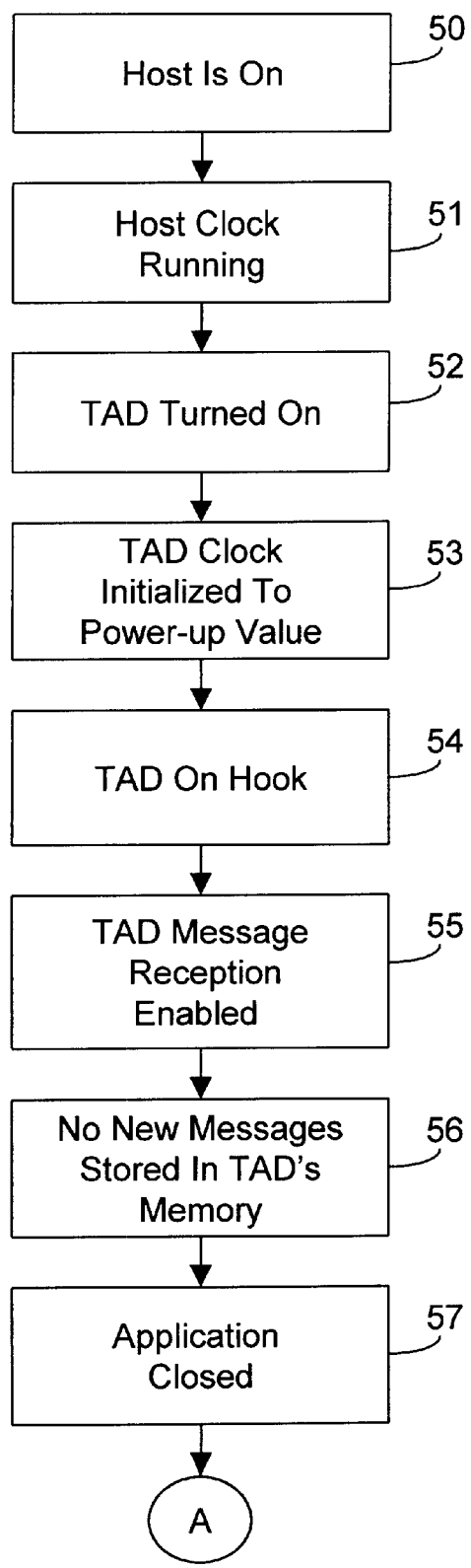
FIGS. 2A–2H is a flow chart which illustrates one example of the operation of a telephone answering apparatus in accordance with the invention.
Figure 2B:
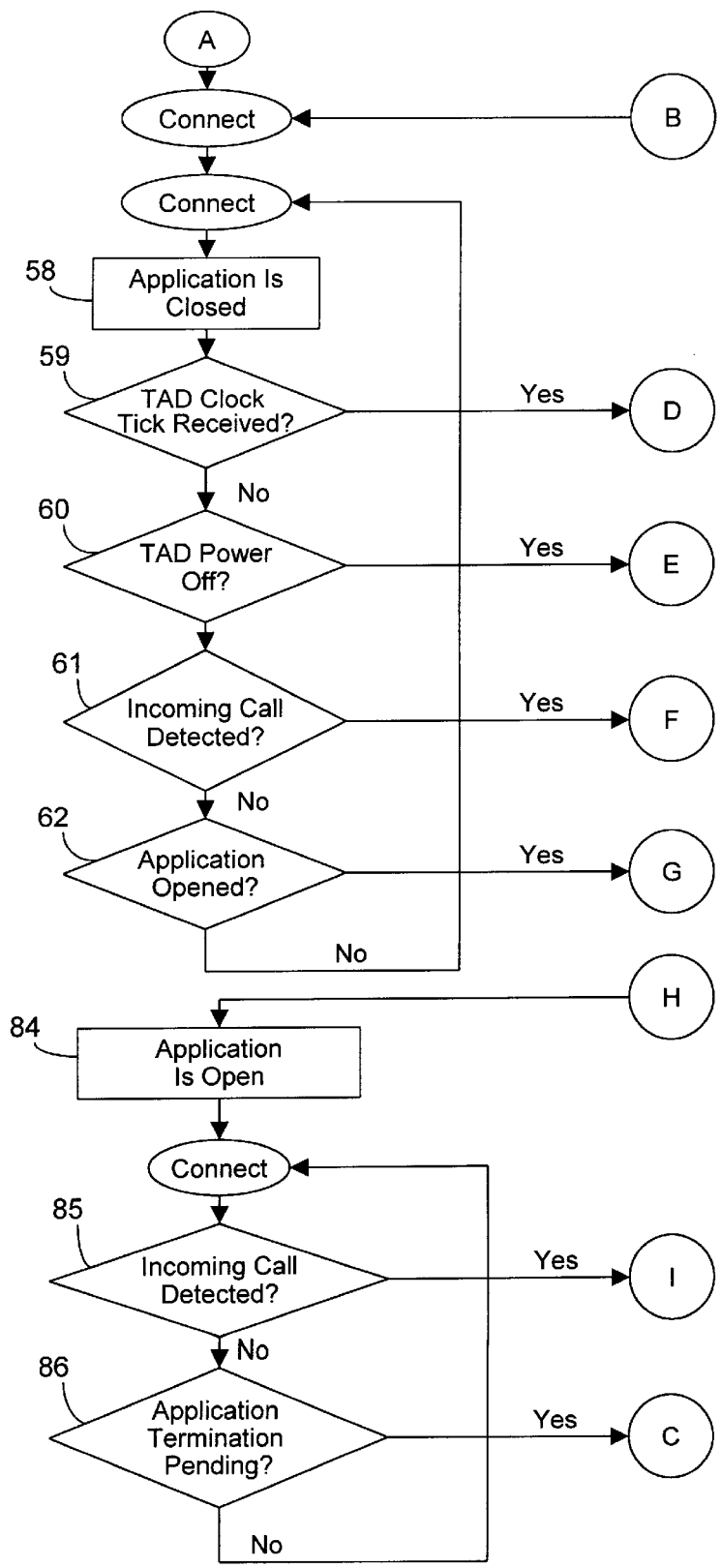

FIG. 2B represents a series of independent events which may occur during the operation of the telephone answering apparatus 10 when the application 38 is closed (Block 58) and when the application 38 is open (Block 84). As shown in FIGS. 2B and 2D, if the device clock 30 receives a tick from the timer 31 (Block 59), the controller 28 determines if the device clock 30 is at the power-up value (Block 63). If the device clock 30 does not contain the power-up value (Block 63), and is not at the maximum value (Block 64), the device clock 30 is incremented to an incremented device clock value (Block 65).

Figure 2C:
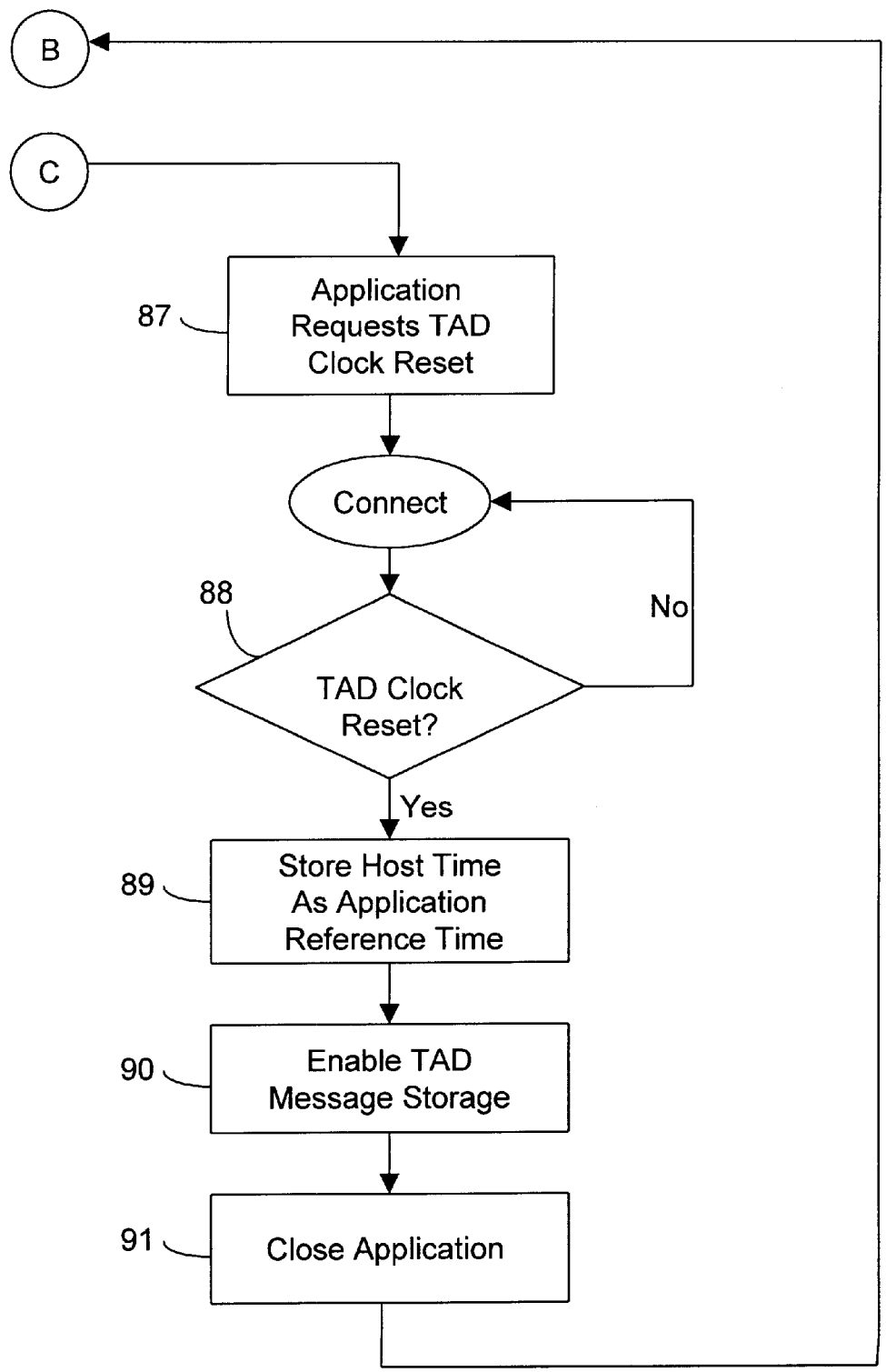
Figure 2D:
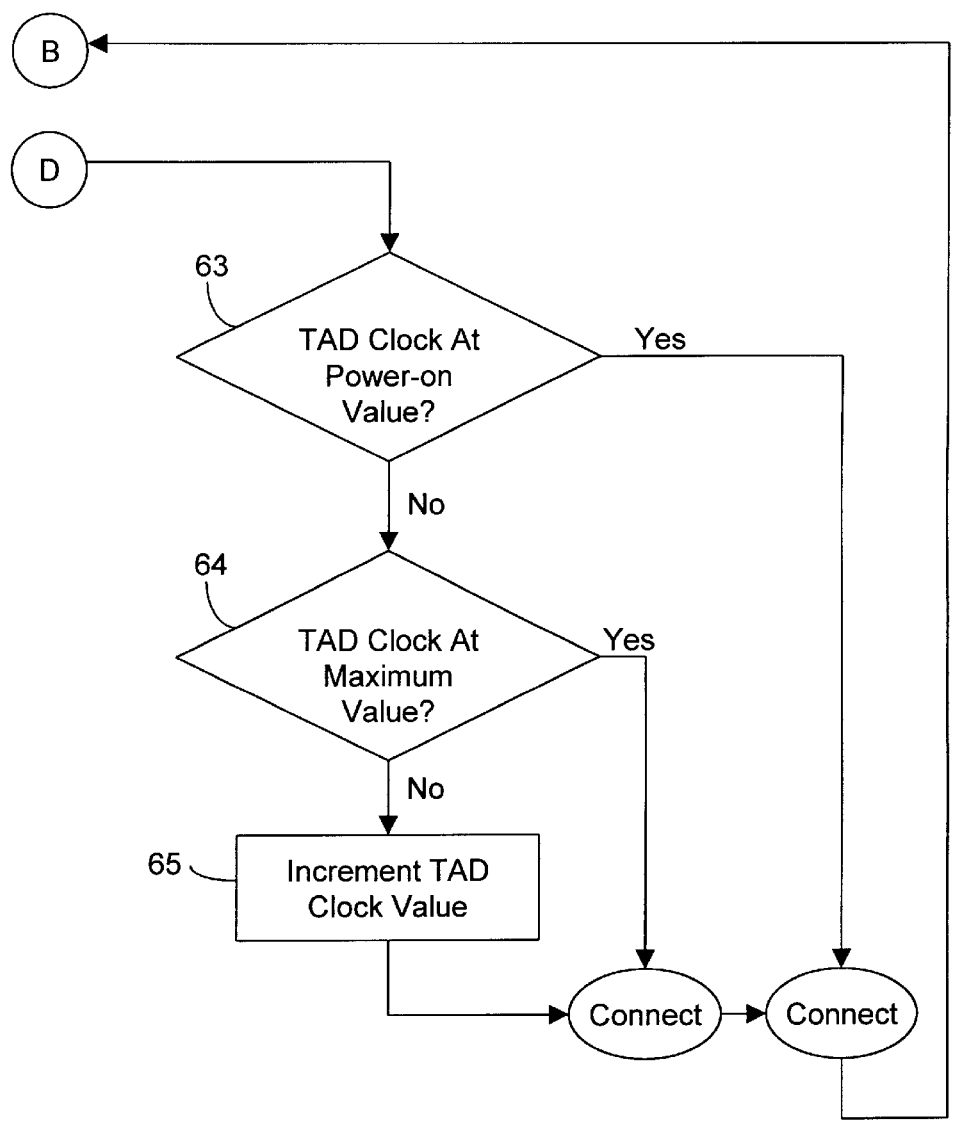
Figure 2E:
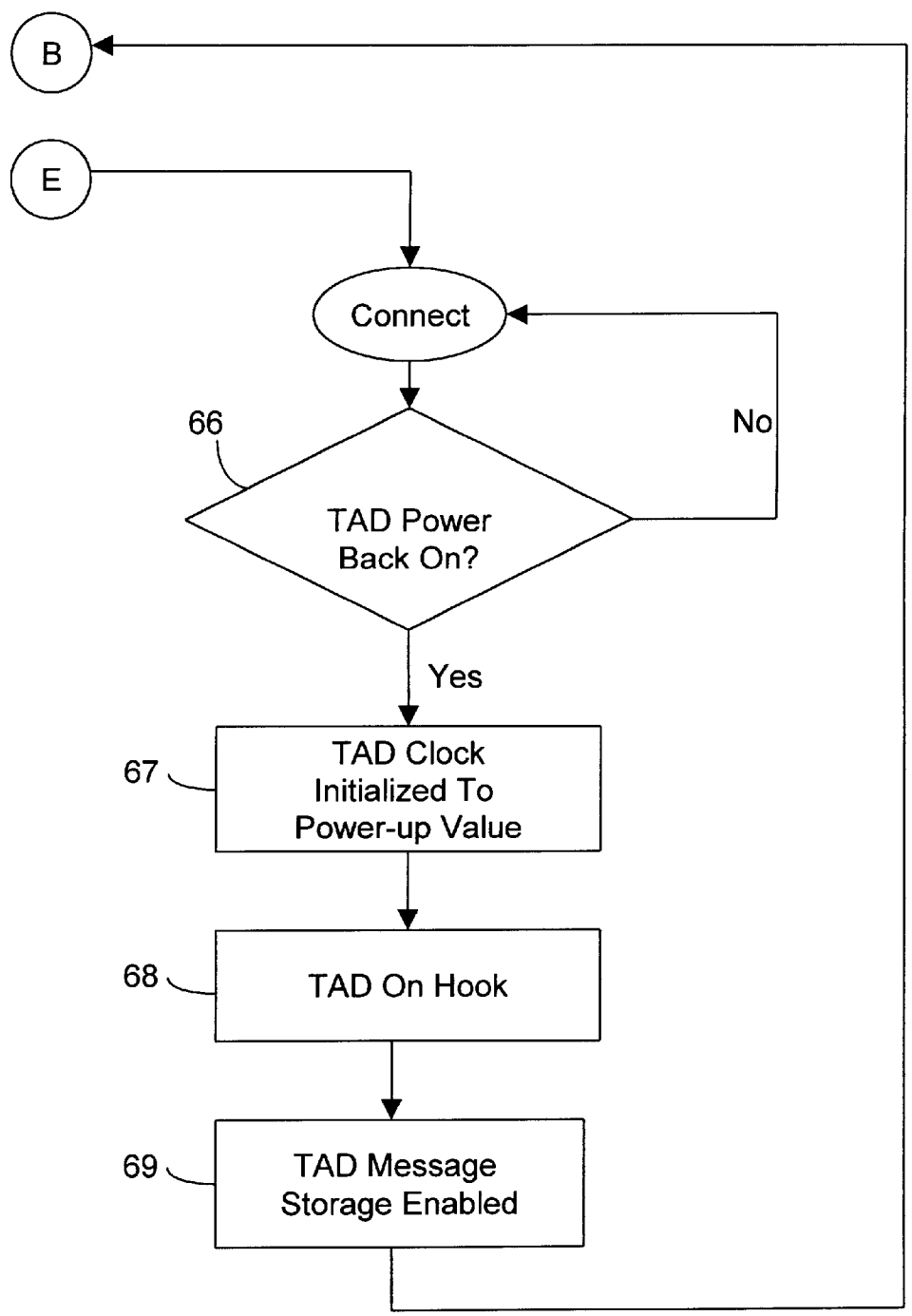

As shown in FIGS. 2B and 2E, if the power to the telephone answering device 12 is off (Block 60), the controller 28 execution stops. If the power is turned back on (Block 66), the controller 28 initializes the device clock 30 to the power-up value (Block 67). The telephone answering device 12 is in the on-hook state or condition (Block 68) and message reception and storage by the telephone answering device 12 is enabled (Block 69).

Figure 2F:
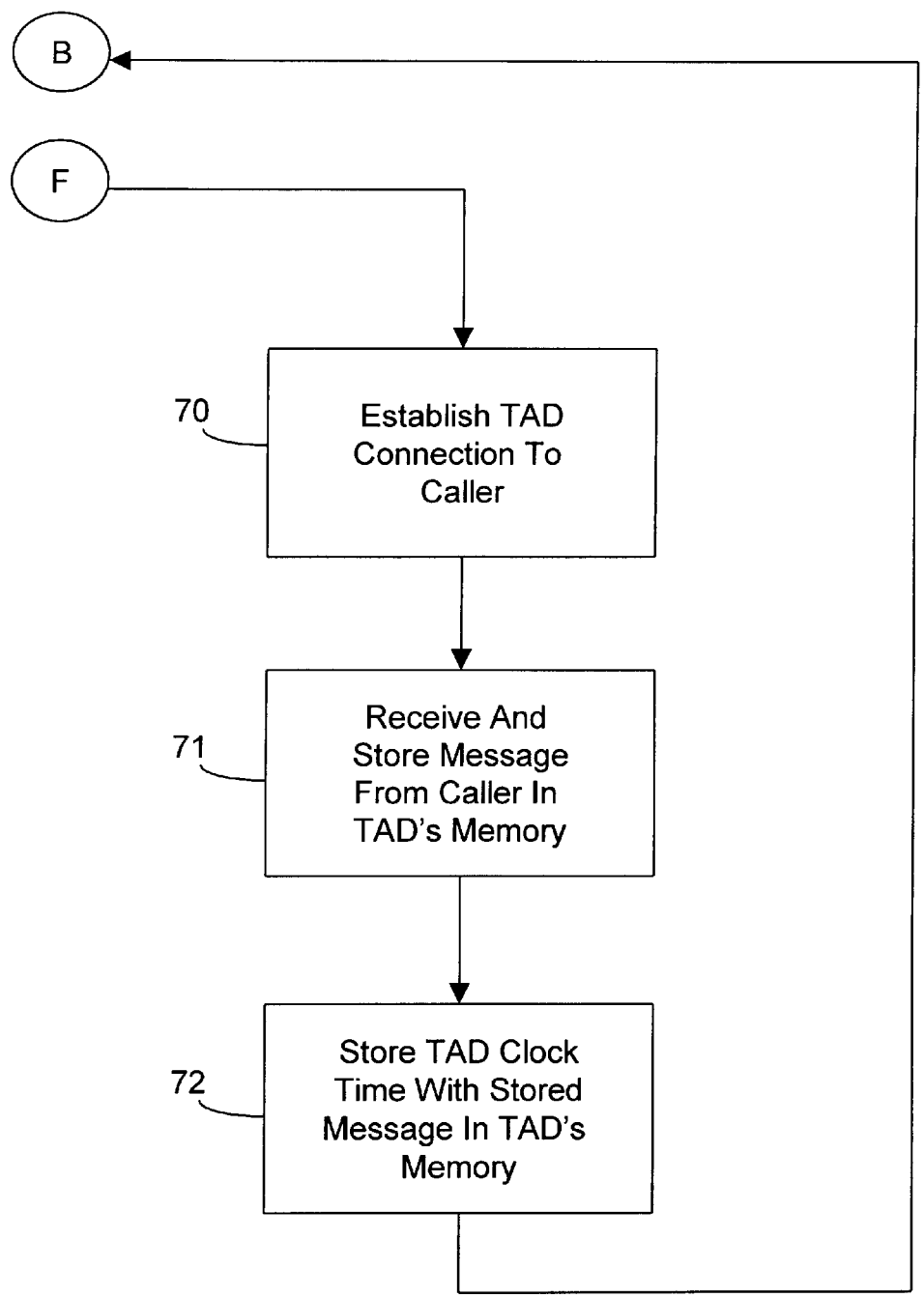

As shown in FIGS. 2B and 2F, if an incoming call is detected by the ring detector 34 (Block 61) while the application 38 is closed (Block 58), a telephone connection between a caller 16 and the telephone answering device 12 is established (Block 70). The message is received by the audio receiver 32 and is stored in the memory device 40 (Block 71). The message is stored with an incremented device clock value or power-up value in the memory 40 (Block 72).

Figure 2G:
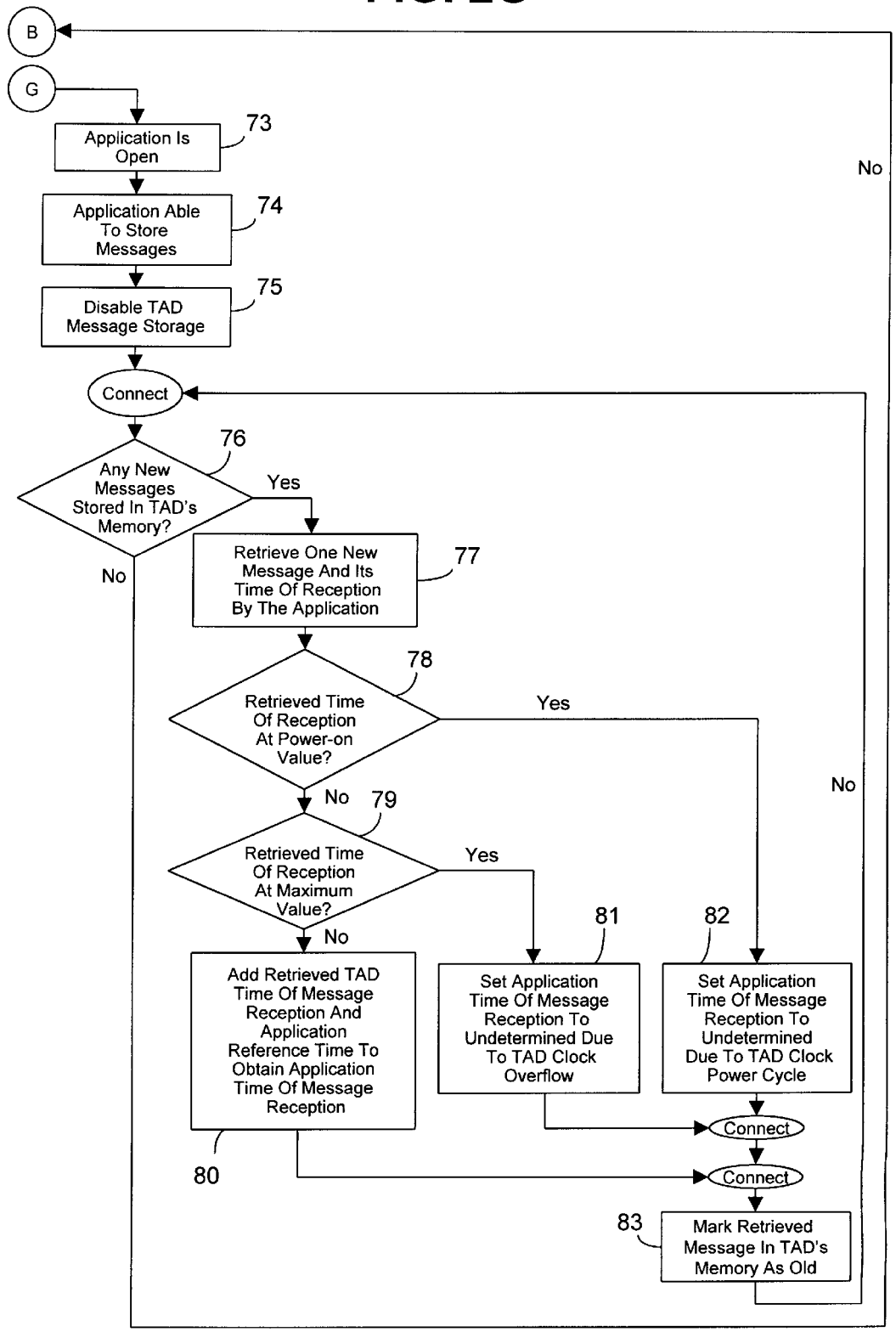
Figure 2H:
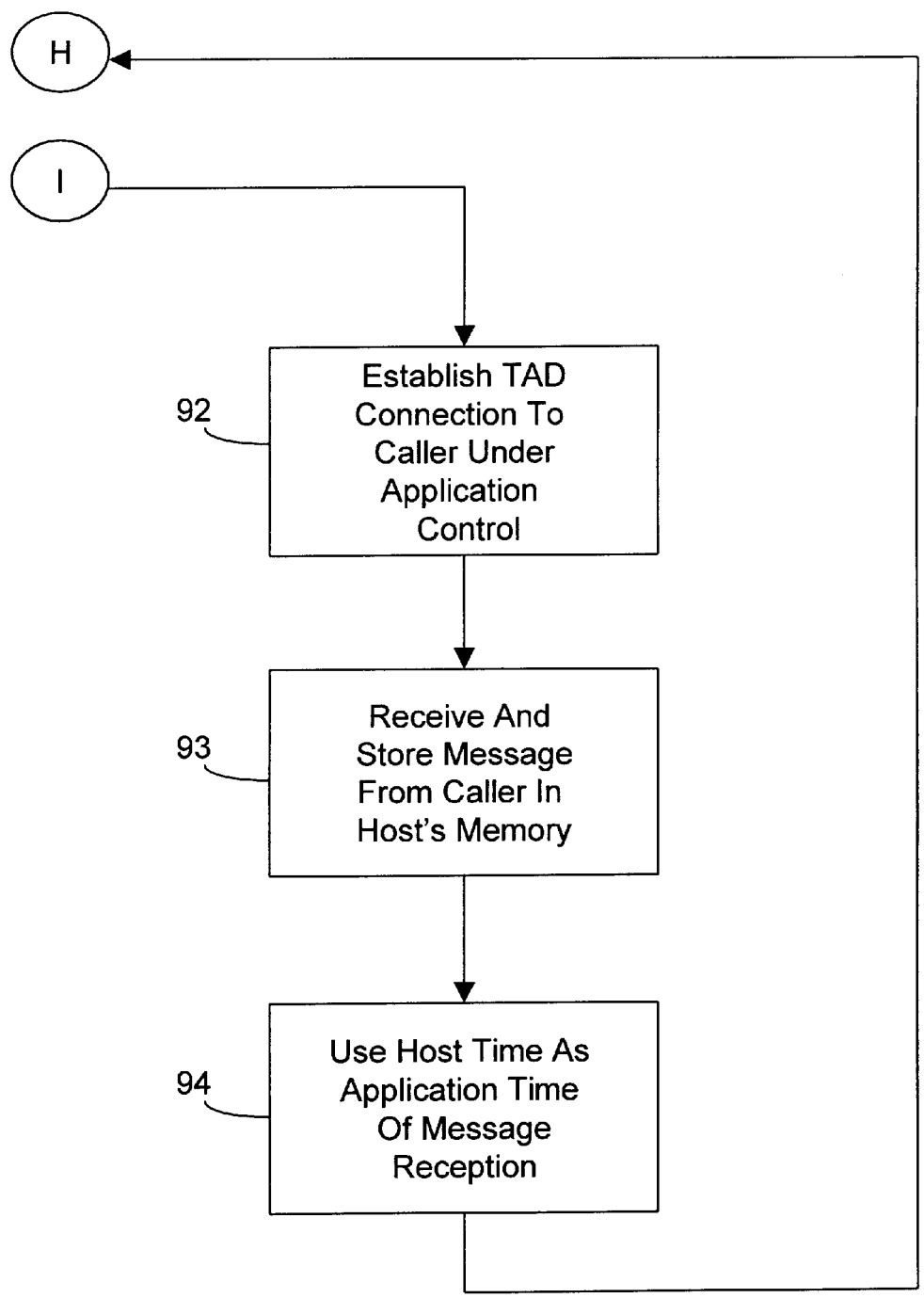

As shown in FIGS. 2B and 2H, if an incoming call is detected while the application 38 is open (Blocks 84, 85), a telephone connection between a caller 16 and the telephone answering device 12 is established under the control of the application 38 (Block 92). The message is received and stored in the memory 39 of the host computer 14 (Block 93). The host time is used as the application time of message reception (Block 94).

As shown in FIGS. 2B and 2C, if termination of the application 38 is requested by a user of the host computer 14 (Block 86), the application 38 requests that the device clock 30 of the telephone answering device 12 be reset to a zero device clock value or start-time value (Block 87). If the resetting of the device clock 30 is complete (Block 88), a reference host time is stored on the host computer 14 as a reference host clock value (Block 89). The telephone answering device 12 is enabled to store incoming messages (Block 90). The application 38 subsequently closes (Block 91).

As shown in FIGS. 2B and 2G, when an operator of the host computer 14 desires to retrieve messages stored in the telephone answering device 12, the application 38 is opened (Block 62 and 73) and is able to store messages in the form of audio data from the telephone answering device 12 (Block 74). The telephone answering device 12 is disabled to prevent it from storing messages in memory 40, and the audio data is transferred through the application 38 and is stored in the host memory 39 (Block 75). If a new message is stored in the memory device 40 of the telephone answering device 12 while the application 38 was closed (Block 76), the application 38 retrieves the new message and its associated incremented device clock value or power-up value (Block 77).

If the retrieval time of reception is at the power-up value (Block 78), the application 38 sets the time of message reception to a value indicating that no time was recorded (Block 82). If the retrieval time of reception is not at the power-up value, but is at a maximum value (Block 79), the application 38 sets the time of message reception to an undetermined value (Block 81). If the retrieved time of reception is not at the power-up value and not at a maximum value (Blocks 78 and 79), the application 38 adds the incremented device clock value to the reference host clock value to determine the actual date and time of message reception (Block 80). The retrieved message is then marked as old so that the telephone answering device 12 can distinguish a message which has been retrieved from a message that has not be retrieved (Block 83). One advantage of this arrangement is that the complete date and time of a message reception may be determined by the application 38 of the host computer 14 which minimizes the space and program requirements in the telephone answering device 12. In addition, the initialization of the device clock 30 to a power-up value upon power-up of the telephone answering device 12 prevents the host computer 14 from displaying an erroneous time of message reception. The user of the host computer 14 is also informed that the device clock 30 experienced a power cycle.

The telephone answering apparatus 10 may be used for in a wide variety of automatic telephone answering systems including, for example, automatic telephone message recording equipment, automatic telephone call forwarding equipment, automatic dial-up alarm receiving equipment, and automatic answering data entry systems. It is contemplated that the telephone answering apparatus 10 may be used in wide variety of other types of telephone answering systems.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A telephone answering apparatus for indicating the presence of a power cycle comprising:

a memory device and a clock having a plurality of operating modes, the clock including a plurality of clock values associated with the plurality of operating modes, wherein the memory device stores a received message and at least one of the plurality of clock values from the clock; and a controller operatively connected to the memory device and to the clock, wherein the controller initializes the at least one of the plurality of clock values to a power-up value upon receiving power from a source and stores the power-up value along with a stored message in the memory device and wherein the power-up value of the clock is different from any of the plurality of clock values associated with the plurality of operating modes.

2. The telephone answering apparatus of claim 1 further comprising a timer operatively connected to the clock.

3. The telephone answering apparatus of claim 2 further comprising an application interface operatively connected to the controller to allow an application to reset the clock to a start-time value.

4. The telephone answering apparatus of claim 3 further comprising an audio receiver operatively connected to the controller.

5. The telephone answering apparatus of claim 4 wherein the audio receiver is operatively connected to a 2-wire to 4-wire network circuit.

6. The telephone answering apparatus of claim 5 wherein the 2-wire to 4-wire network circuit is operatively connected to a switch.

7. The telephone answering apparatus of claim 6 wherein the audio receiver, timer, clock and controller are operatively connected to a processor.

8. The telephone answering apparatus of claim 7 wherein the processor is operatively connected to a power supply.

9. The telephone answering apparatus of claim 1 wherein the memory device comprises flash memory.

10. A method of operating a telephone answering apparatus for indicating the presence of a power cycle comprising:

providing a processor operatively connected to a controller, audio receiver, timer and clock having a plurality of operating modes, the clock including a plurality of clock values associated with the plurality of operating modes, the controller operatively connected to a memory device and an application interface;

supplying power to the processor;

initializing the clock to a power-up value that is different from any of the plurality of clock values associated with the plurality of operating modes;

receiving a message on the audio receiver while the clock is set to the power-up value, and storing the message and the power-up value in the memory device.

11. The method of claim 10 further comprising:

retrieving the message and power-up value into an application running on a host computer.

12. The method of claim 11 further comprising:

sending an application input through the application interface to the controller; and resetting the clock to a start-time value.

13. The method of claim 12 further comprising:

receiving a message over a GSTN line by the audio receiver.

14. The method of claim 12 further comprising:

storing a received message in the memory device after the clock is set to the start-time value.

15. The method of claim 14 further comprising:

sending ticks from the timer to the clock, incrementing the clock start-time value to a clock value.

16. The method of claim 15 further comprising:

saving the message received after the clock is set to the start time value and the clock value to the memory device.

17. A method of indicating the presence of a power cycle on a time-stamped recorded message comprising:

providing a clock having a plurality of operating modes, the clock including a plurality of clock values associated with the plurality of operating modes;

powering up a processor;

initializing a clock to a power-up value that is different from any of the plurality of clock values associated with the plurality of operating modes;

receiving a message, and storing the message and the power-up value to a memory device.

18. The method of claim 17 further comprising:

setting the clock to a start-time value; incrementing the clock to provide a clock value; receiving a second message after the clock is set to a start-up value, storing the second message and the clock value to the memory device.

19. The method of claim 18 further comprising retrieving the second message and the clock value to an application, and determining whether the clock value is valid.

20. The method of claim 17 further comprising:

retrieving the message and power-up value into an application running on a host computer and indicating that no time was recorded for the message on the host computer.

* * * * *